Feb. 26, 1963 G. L. RICHARDS 3,079,560

SINGLE TRANSISTOR GLOW TUBE TRIGGER

Filed April 30, 1959

INVENTOR.
GLENN L. RICHARDS

BY F. H. Henson

ATTORNEY

United States Patent Office 3,079,560
Patented Feb. 26, 1963

3,079,560

SINGLE TRANSISTOR GLOW TUBE TRIGGER

Glenn L. Richards, Rochester, N.Y., assignor to General Dynamics Corporation, Rochester, N.Y., a corporation of Delaware Filed Apr. 30, 1959, Ser. No. 810,046
14 Claims. (Cl. 328—210)

The present invention relates to trigger circuits and more particularly to single transistor trigger circuits.

Due to the utilization of extremely large numbers of trigger circuits in data processing and other electronic systems, the question of cost per trigger is an important one. Generally, two transistors are employed in each trigger and if a visual indication of the binary state of the trigger is desired on a permanent basis, a neon diode is often added. It is, of course, desirable to reduce the number of components required to perform this function.

Accordingly, it is a principal object of the present invention to provide new and improved and less expensive trigger circuits.

It is a further object of the present invention to provide new and improved bistable and monostable trigger circuits which utilize a single transistor of either the point contact or the junction type.

It is a still further object of the present invention to provide for bistable and monostable triggers which utilize a single transistor of the junction or point contact type operative in conjunction with a neon glow diode so that a visual indication of the binary state of the trigger is had on a permanent basis.

Yet a further object of the present invention is to provide for two state devices which consume electrical power when in the "on" state only.

The principal feature of the present invention is the provision of a capacitor connected in series with a neon glow diode and a transistor, the voltage previously developed across said capacitor causing the neon diode to fire when the transistor is momentarily rendered conductive by the application of a first input pulse, and to thereafter draw current through the control electrode of the transistor, thereby to maintain bias on the transistor which in turn sustains conduction through the transistor from the emitter to the collector until the application of a second pulse which overcomes this bias and extinguishes conduction through both the neon diode and the transistor.

Further objects and advantages of my invention will become apparent as the following description proceeds and the features of novelty which characterize my invention will be pointed out with particularity in the claims annexed to and forming a part of this specification.

Figure 1:
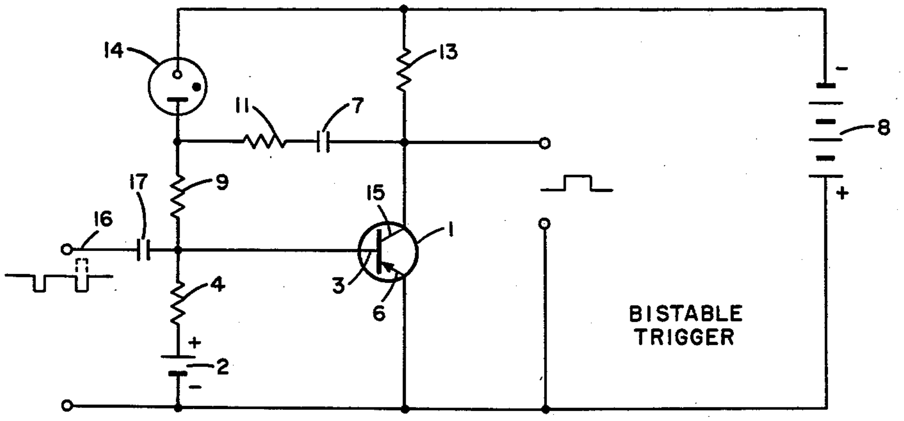

For a better understanding of my invention, reference may be had to the accompanying drawing of which:

FIGURE 1 discloses a preferred embodiment of the bistable trigger circuit of the present invention.

Figure 2:
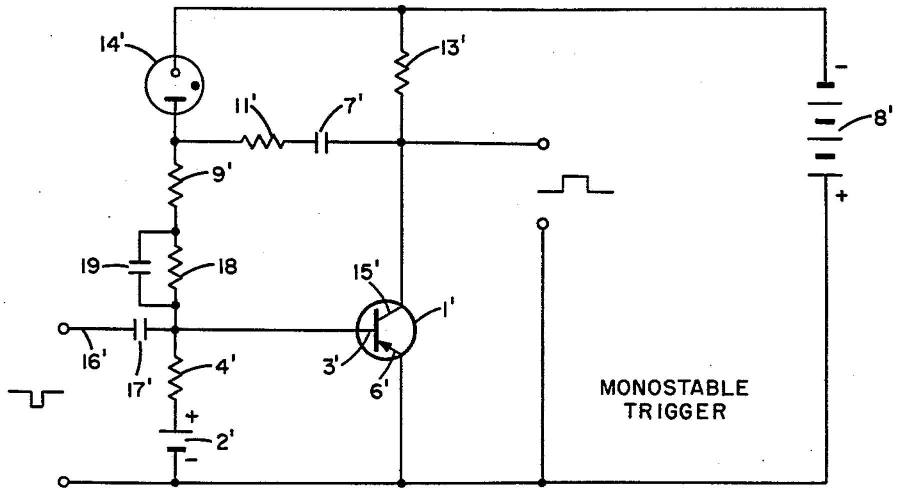

FIGURE 2 discloses a preferred embodiment of the monostable trigger circuit of the present invention.

Referring now to FIGURE 1 of the drawing, PNP transistor 1 is disclosed, biased to nonconduction by voltage source 2 whose positive terminal is connected to the base or control electrode 3 through resistor 4 and whose negative terminal is connected to emitter 6. Capacitor 7 is charged by voltage sources 2 and 8 through resistors 4, 9, 11 and 13. Gas diode 14 is in a state of nonconduction because a voltage greater than the sum of the voltages produced by voltage sources 2 and 8 is needed to cause conduction through the diode. In order to change the state of the bistable flip-flop of FIGURE 1, a negative-going pulse is applied to input terminal 16 and base electrode 3 through coupling capacitor 17. This action causes current to flow between emitter 6 and collector 15 and also causes the emitter-collector impedance to become sharply reduced. Because capacitor 7 has been already charged, it now acts as a voltage source connected in series with voltage source 8 through the emitter and collector of transistor 3. Hence, the voltage across the terminals of gas diode 14 is greatly increased over the voltage previously existing across these terminals and gas diode 14 is fired and commences to draw current through resistor 9, base electrode 3 and emitter 6. Owing to the emitter to base impedance of transistor 1, a voltage drop is produced between emitter and base by this current flow and the transistor becomes biased to conduction, and remains so biased as long as diode 14 remains conductive. Hence transistor 1 remains in a conductive state although the negative pulse applied to input terminal 16 is no longer present. It should be noted that less voltage is required across the terminals of gas diode 14 to maintain conduction than to initiate conduction. The application of a positive pulse to base electrode 3 causes the transistor to momentarily cease conducting. This causes the collector of transistor 1 to become more negative and a negative pulse passes through capacitor 7 to extinguish diode 14. Also, since the impedance of the emitter base circuit of transistor 1 becomes very high at this time, resistor 4 is in effect electrically reinserted into the series circuit including resistor 9 and diode 14 thereby to reduce the voltage across diode 14 to extinguish it. Upon removal of the positive pulse, transistor 3 remains in a state of nonconduction since voltage source 2 holds base electrode 3 more positive than emitter 6.

Providing the time constant of coupling capacitor 17 and resistor 4 is properly selected with respect to a given width of input pulse, a negative pulse identical to the first negative pulse which caused the transistor 1 to conduct, will cause the trigger to revert back to its original state. This follows from the fact that upon cessation of the negative pulse, a positive pulse will be produced by the discharge of capacitor 17 through resistor 4 sufficient to hold conduction through the transistor and cause the diode to become extinguished as explained above. See "Pulse Techniques," U.S. Army Technical Manual TM11-672, October 1951, page 10, regarding the selection of the above-mentioned time constant. Hence positive or negative pulses may be utilized to turn the flip-flop off, although only a negative pulse will turn it on. Transistor 3 and gas diode 14 will remain in a state of nonconduction until a negative pulse is again applied to the base electrode. Since the gas diode may be of the glow type, a visual indication of the state of conduction of transistor 1 is had.

FIGURE 2 discloses a monostable trigger which is identical with the circuit of FIGURE 1 except for the insertion of resistor 18 and capacitor 19 between resistor 9′ and base electrode 3′ as shown in FIGURE 2. A negative pulse applied to input terminal 16′ causes transistor 1′ and gas diode 14′ to conduct as in the operation of the embodiment of FIGURE 1. Gas diode 14′ draws current through resistor 9′, capacitor 19 and base electrode 3′ just after it starts conducting. After a certain time interval capacitor 19 will become fully charged. When this occurs, current drawn by the gas diode must all pass through resistor 18 whose resistance is quite high, and consequently this current is sharply reduced. Transistor 1′ becomes cut off due to the reduction of emitter to base current and the collector becomes more negative, to cause a negative pulse to pass through capacitor 7′ to extinguish the gas diode as in the case of the bistable trigger described hereinbefore. As in the operation of the bistable trigger of FIGURE 1, the cessation of current flow through the base electrode 3′ causes the base electrode to become more positive with respect to the emitter and transistor 1′ reverts back to the nonconductive state.

Thus the insertion of capacitor 19 and resistor 18 in the circuit of FIGURE 1 provides for monostable operation.

The values of components utilized in the model were as follows:

| | |
|---|---|
| Resistor 4 | 33K |
| Resistor 9 | 33K |
| Resistor 11 | 10K |
| Resistor 13 | 33K |
| Resistor 18 | 1 meg. |
| Capacitor 7 | .1 $\mu$f. |
| Capacitor 17 | .1 $\mu$f. |
| Capacitor 19 | .1 $\mu$f. |
| Transistor 1 | 2N398 |
| Voltage source 2 | 1.5 v. |
| Voltage source 8 | 70 v. |

Of course, NPN transistors could also be utilized by reversing the bias voltages.

It should be understood that the practice of this invention is not limited to the use of transistors. For instance, hard tubes may be readily substituted for the transistors.

While I have shown and described a specific embodiment of my invention, other modifications will readily occur to those skilled in the art. I do not therefore desire my invention to be limited to the specific arrangement shown and described, and I intend in the appended claims to cover all modifications within the spirit and scope of my invention.

What is claimed is:

1. A trigger circuit comprising an amplifying element having an input electrode, an output electrode and a control electrode for controlling the current flow between said input electrode and said output electrode, a breakdown device having two terminals and requiring a relatively high voltage across said terminals to cause said device to conduct, requiring a lower voltage across said terminals to maintain conduction through said device and requiring a still lower voltage across said terminals to extinguish current flow through said device, means responsive to the initiation of current flow within said amplifying device between said input electrode and said output electrode for producing a voltage across the terminals of said breakdown device of sufficient magnitude to cause said device to conduct, means connecting said device to the control electrode of said amplifying element for biasing said element to maintain conduction through said element as long as said breakdown device is in a state of conduction and means to thereafter alter the bias applied to said amplifying element to cause cessation of current flow through said amplifying element and said breakdown device.

2. The combination as set forth in claim 1 wherein said means to alter the bias applied to said amplifying element includes a capacitor.

3. The combination as set forth in claim 1 wherein said breakdown device comprises a gas diode.

4. The combination as set forth in claim 3 wherein said gas diode comprises a glow tube thereby to give a visual indication of the state of conductivity of said amplifying element.

5. A trigger circuit comprising an amplifying element having an input electrode, an output electrode and a control electrode for controlling the current flow between said input electrode and said output electrode, a breakdown device having two terminals and requiring a relatively high voltage across said terminals to cause said device to break down and conduct, requiring a lower voltage across said terminals to maintain conduction through said device and requiring a still lower voltage across said terminals to extinguish current flow through said device, means responsive to a change in the state of conduction of said amplifying device for causing said breakdown device to conduct, means for connecting said breakdown device to the control electrode of said amplifying device to control the bias applied to said control electrode in accordance with the state of conduction of said breakdown device.

6. The combination as set forth in claim 5 wherein said amplifying device comprises a transistor.

7. The combination as set forth in claim 5 wherein said breakdown device comprises a gas diode.

8. The combination as set forth in claim 7 wherein said gas diode comprises a glow tube diode to thereby produce a visual indication of the state of conduction of said amplifying device.

9. The combination as set forth in claim 5 wherein said means responsive to a change in the state of conduction of said amplifying device for causing said breakdown device to conduct includes a capacitor.

10. A trigger circuit comprising an amplifying element having an input electrode, an output electrode and a control electrode for controlling the current flow between said input electrode and said output electrode, a breakdown device having two terminals and requiring a relatively high voltage across said terminals to cause current to flow through said device, requiring a lower voltage across said terminals to maintain conduction through said device and requiring a still lower voltage across said terminals to extinguish current flow through said device, means responsive to the initiation of current flow within said amplifying element between said input and output electrodes for producing a voltage across said terminals of sufficient magnitude to cause conduction through said device, the means connecting said breakdown device to the control electrode of said amplifying element for drawing current through said control electrode and for maintaining bias on said amplifying element which is necessary to maintain conduction within said amplifying element between said input and output electrodes after said breakdown device commences to conduct, and means to thereafter alter the afore-mentioned bias applied to said amplifying element to cause said amplifying element and said breakdown device to cease to conduct.

11. The combination as set forth in claim 10 wherein said means to alter the bias applied to said amplifying element includes a capacitor.

12. The combination as set forth in claim 10 wherein said means for producing a voltage across said terminals includes a capacitor.

13. A trigger circuit comprising a source of supply voltage, an amplifying device having an input electrode, an output electrode and a control electrode for controlling the current flow between said input electrode and said output electrode, a first circuit connected across said source including a capacitor, said first circuit being provided to charge up said capacitor when said amplifying device is nonconducting, a second circuit connected across said source comprising said capacitor connected in series with a breakdown device and the input and output electrodes of said amplifying device, said breakdown device having two terminals and requiring a relatively high voltage across said terminals to cause said device to conduct, requiring a lower voltage across said terminals to maintain conduction through said device and requiring a still lower voltage across said terminal to extinguish current flow through said device, means for connecting the first of said terminals to said source and the second of said terminals to the control electrode of said amplifying device to provide bias to enable current to flow between said input and output electrodes when said breakdown device is in a state of conduction and to halt the flow of current between said input and output electrodes when said breakdown device is in a state of nonconduction.

14. The combination as set forth in claim 13 wherein a capacitor is coupled between the second terminal of said breakdown device and said control electrode.

(References on following page)

References Cited in the file of this patent

UNITED STATES PATENTS

| | | |
|---|---|---|
| 2,013,121 | Wheeler | Sept. 3, 1935 |
| 2,168,870 | Goodenough | Aug. 8, 1939 |
| 2,468,197 | Hathaway | Apr. 26, 1949 |
| 2,512,750 | Potter | June 27, 1950 |
| 2,581,456 | Swift | Jan. 8, 1952 |
| 2,593,375 | Williams | Apr. 15, 1952 |
| 2,684,440 | Wallace | July 20, 1954 |
| 2,747,111 | Koch | May 22, 1956 |
| 2,751,445 | Dobosy | June 19, 1956 |
| 2,767,255 | Talamini | Oct. 16, 1956 |
| 2,772,410 | Logue | Nov. 27, 1956 |

UNITED STATES PATENT OFFICE

CERTIFICATE OF CORRECTION

Patent No. 3,079,560 February 26, 1963

Glenn L. Richards

It is hereby certified that error appears in the above numbered patent requiring correction and that the said Letters Patent should read as corrected below.

Column 2, line 38, for "hold" read -- halt --; column 4, line 29, strike out "the".

Signed and sealed this 8th day of October 1963.

(SEAL)
Attest:

ERNEST W. SWIDER
Attesting Officer

EDWIN L. REYNOLDS
Acting Commissioner of Patents